United States Patent Office 2,828,333
Patented Mar. 25, 1958

2,828,333
MANUFACTURE OF p-TOLUENE SULFONIC ACID

Samuel L. Norwood and Thomas W. Sauls, College Park, Ga., assignors to Tennessee Corporation, New York, N. Y., a corporation of New York No Drawing. Application March 29, 1956
Serial No. 574,616

4 Claims. (Cl. 260—505)

This invention relates to the sulfonation of toluene in such a manner as to produce a very high ratio of para-toluene sulfonic acid ortho-toluene sulfonic acid in the sulfonated products.

For some purposes para-toluene sulfonic acid of high purity is needed. This is the case, for example, when the sulfonic acid is used in the manufacture of para-cresol, a disinfectant and fumigant which is also used in dyestuffs, and an intermediate for the manufacture of 2,6 ditertiary butyl cresol which is a well known antioxidant. When toluene is sulfonated by usual processes, however, a substantial amount of isomeric ortho-toluene sulfonic acid is formed along with the desired para-toluene sulfonic acid, and in many cases this mixture is not well suited for use without first being purified. Thus when toluene is sulfonated with sulfur trioxide dissolved in liquid sulfur dioxide by adding one of the reacting liquids into the other according to conventional practice, as much as 8–10% of the undesired ortho isomer may be formed. The separation of the ortho isomer by known purification methods is difficult and expensive.

We have found that the following procedure results in a substantial increase in the amount of the desired para isomer formed in the reaction and a corresponding reduction in the amount of the undesired ortho isomer, thus minimizing the purification process as well as giving a more economical yield.

The sulfonation mixture is prepared by dissolving $SO_3$ in liquid $SO_2$. The amount of $SO_3$ should be between 0.9 and 1.25 moles per mole of toluene to be sulfonated. The proportion of $SO_2$ to $SO_3$ is not critical and may vary widely, but usually will be within the limits of 5 to 20 parts by weight of liquid $SO_2$ to one part of $SO_3$.

The sulfonation reaction is carried out substantially at atmospheric pressure and the temperature is dependent on the ratio of $SO_2$ to $SO_3$. When the weight ratio of these materials is 5:1, for example, the temperature of the reaction mixture may be about 22° F., whereas if the weight ratio is 8:1 or higher the temperature is about 14° F. Before addition to the reactor, the toluene will usually be at room temperature, say 70–85° F. When the sulfonation medium and the toluene are mixed in the reactor, the temperature of the reaction mixture may rise somewhat (say to 32° F. or more) due to absorption of heat from the reaction vessel by the incoming reagents, but soon drops back to a fairly constant figure between about 14° F. and 22° F.

The reactants (i. e., the toluene and the $SO_2$–$SO_3$ sulfonation medium) are added to the reactor simultaneously at equivalent rates, and the reaction takes place practically instantaneously so that at no time is there any substantial excess of either reactant. The simultaneous addition of the two liquid reactants can be made rapidly if desired, provided there is sufficient cooling capacity to condense the sulfur dioxide evolved by the heat of reaction. The addition time can be extended substantially, however, without lowering the ratio of para isomer to ortho isomer, and it may be preferred to do so in practice in order to reduce the cooling capacity required. For example, excellent results have been obtained when the addition of 9000 lbs. of sulfur trioxide-sulfur dioxide mixture and of the corresponding amount of toluene was spread out over a period of about an hour.

If desired, glacial acetic acid in amount not greater than about 2% of the sulfonic acid to be formed can be added to the reaction vessel. As disclosed and claimed in our copending application Serial No. 454,201 filed September 3, 1954, the acetic acid in conjunction with the low temperature of the reaction minimizes sulfone formation.

After the addition of the reactants is complete, it is only necessary to remove and recover the residual $SO_2$ in any suitable manner.

The following is a specific working example of a process embodying the invention:

A mixture of 1000 lbs. of liquid sulfur trioxide dissolved in 8000 lbs. of liquid sulfur dioxide is added at equivalent rates with 1141 lbs. of toluene into a mixing tank containing 17.1 lbs. of glacial acetic acid. An addition time of one hour is used. Thereafter the sulfur dioxide is evaporated with heat from a steam jacket over a three hour period and is condensed for re-use. When the temperature of the acid reaches 100° F. it is discharged into an open vessel with a blower system for sweeping residual sulfur dioxide vapors from the acid. After one hour at 120° F. in this vessel the product is virtually free of sulfur dioxide and is ready for storage.

The temperature of the liquid sulfur dioxide-sulfur trioxide mixture as it enters the reactor is approximately 17° F. The temperature of the toluene as it enters the reactor is 70–85° F. The temperature of the actual reaction mixture ranges from 17–32° F. but averages 18° F. during the addition of reactants. Little or no positive pressure is present in the system as the sulfur dioxide evolved as gas, due to the heat of reaction, is liquified by cooling in the refrigerated condenser system.

The ratio of para to ortho isomers produced by the foregoing procedure can be determined by the method described by Holleman and Celand, Ber. 44, 2504–25 (1911), and by Harding, J. Chem. Soc. 119, 260–2 (1921). Briefly, the toluene sulfonic acid or its salt is converted to toluene sulfonyl chloride by reaction with phosphorous pentachloride and phosphorous oxychloride. After careful purification of the sulfonyl chloride by distillation, the freezing or melting point of the mixture indicates the ratio of isomers.

As compared with usual batch procedures in which one of the reacting liquids is added more or less gradually into the other liquid, the ratio of para to ortho isomers obtained by the procedure set forth above is substantially higher. For example, in a series of runs according to the above specific working example, the average composition of the product obtained was as follows:

92.5% p-toluenesulfonic acid
3.5% o-toluenesulfonic acid
1.0% sulfone
2.0% $H_2SO_4$
0.78% acetic acid
Traces of moisture and toluene As compared with the average ratio of para to ortho isomer of 96.2/3.8, the corresponding ratio in the case of usual batch procedures averages about 91.5/8.5. Further in some cases the procedure embodying the present invention resulted in ratios as high as 97/3.

It will be understood that the invention is not limited to the details of the foregoing description and that reference should be had to the appended claims for a definition of its limits.

1. A process for making toluene sulfonic acid having a high ratio of para isomer to ortho isomer which comprises sulfonating toluene with 0.9 to 1.25 moles of sulfur trioxide per mole of toluene, the sulfur trioxide being dissolved in liquid sulfur dioxide, conducting the sulfonation reaction by adding liquid toluene and the liquid $SO_3$-$SO_2$ mixture simultaneously to the reaction vessel at substantially equivalent rates and at substantially atmospheric pressure while condensing the $SO_2$ evolved by the heat of reaction, and then removing residual $SO_2$ from the sulfonation mass.

2. The process defined in claim 1, said liquid $SO_3$-$SO_2$ mixture containing between 5 and 20 parts of $SO_2$ per part of $SO_3$.

3. The process defined in claim 1, wherein the rates of addition of the toluene and of the $SO_3$-$SO_2$ mixture are regulated so that the period of addition is about one hour.

4. The process defined in claim 3 wherein after the addition of the reagents is complete, the sulfonation mass is heated to a temperature of about 100°–120° F. to remove residual $SO_2$ therefrom.

References Cited in the file of this patent

UNITED STATES PATENTS

| 1,422,564 | Grob et al. | July 11, 1922 |
| 2,225,564 | Le Maistre | Dec. 17, 1940 |
| 2,362,612 | Brown | Nov. 14, 1944 |
| 2,704,295 | Gilbert et al. | Mar. 15, 1955 |

U. S. DEPARTMENT OF COMMERCE
PATENT OFFICE

CERTIFICATE OF CORRECTION

Patent No. 2,828,333                            March 25, 1958

Samuel L. Norwood et al.

It is hereby certified that error appears in the printed specification of the above numbered patent requiring correction and that the said Letters Patent should read as corrected below.

Column 1, line 17, after "acid", first occurrence, insert -- to --.

Signed and sealed this 20th day of May 1958.

(SEAL)
Attest:
KARL H. AXLINE
Attesting Officer

ROBERT C. WATSON
Commissioner of Patents